United States Patent
Behl et al.

(10) Patent No.: US 8,301,783 B2
(45) Date of Patent: Oct. 30, 2012

(54) METHOD, SYSTEM, AND COMPUTER PROGRAM PRODUCT FOR EFFICIENTLY SERIALIZING NAVIGATIONAL STATE IN A PORTAL

(75) Inventors: Stefan Behl, Holzgerlingen (DE);
Carsten Leue, Sindelfingen (DE); Falk Posch, Hildrizhausen (DE)

(73) Assignee: International Business Machines Corporation, Armonk, NY (US)

( * ) Notice: Subject to any disclaimer, the term of this patent is extended or adjusted under 35 U.S.C. 154(b) by 1126 days.

(21) Appl. No.: 12/097,425

(22) PCT Filed: Oct. 18, 2006

(86) PCT No.: PCT/EP2006/067533
§ 371 (c)(1), (2), (4) Date: Jun. 13, 2008

(87) PCT Pub. No.: WO2007/068520
PCT Pub. Date: Jun. 21, 2007

(65) Prior Publication Data
US 2008/0295003 A1    Nov. 27, 2008

(30) Foreign Application Priority Data
Dec. 14, 2005   (EP) ..................................... 05112112

(51) Int. Cl.
*G06F 15/16* (2006.01)
(52) U.S. Cl. .................. 709/228; 709/217; 715/760
(58) Field of Classification Search .................. 709/217, 709/228; 715/760
See application file for complete search history.

(56) References Cited

U.S. PATENT DOCUMENTS

| | | | |
|---|---|---|---|
| 6,081,842 A * | 6/2000 | Shachar | 709/229 |
| 6,338,089 B1 * | 1/2002 | Quinlan | 709/227 |
| 6,606,525 B1 * | 8/2003 | Muthuswamy et al. | 700/52 |

(Continued)

FOREIGN PATENT DOCUMENTS
JP        2002-297568       10/2002

OTHER PUBLICATIONS

Manabu Sugai, "XML Tutorial for Java Programmer", Java WORLD, vol. 7, No. 12, IDG Japan, p. 138-154, Dec. 1, 2003.

(Continued)

*Primary Examiner* — Thomas Daily
(74) *Attorney, Agent, or Firm* — Steven M. Greenberg, Esq.; Carey, Rodriguez, Greenberg & O'Keefe (57) ABSTRACT

The present invention provides a method, system, and computer program product for efficiently serializing navigational state into URLs or the header of the new portal page by using a complete stream-based serialization. The inventive serialization is divided into two sub-processes which are both stream-based. The first stream-based serialization sub-process which is hierarchy-oriented uses the hierarchical object representation of the navigational state and transforms it into a series of events. The events serve as the input for various strategies for compacting information that is associated with these events. At the end of the sub-process the compacted navigational state information carried by the received events is transformed into a character-based representation and the hierarchical structure of the navigational state is derived from the order of the received events and transformed into an additional character-based representation both being directly streamed to the second sub-process.

The second stream-based serialization sub-process which is hierarchy-independent uses the result of the first sub-process and applies further compression and character encoding strategies and finally streams the compressed and character encoded information into a URL or header of said new Portal page.

Both sub-processes are seamlessly linked together.

The inventive stream-based serialization method is efficient because it minimizes the overall processing time needed to generate a URL and also effective because it makes sure that the serialization result is as short as possible to meet the requirements regarding URL length and markup size.

18 Claims, 4 Drawing Sheets

U.S. PATENT DOCUMENTS

| | | |
|---|---|---|
| 2003/0005001 A1 | 1/2003 | Kataoka |
| 2003/0037232 A1 | 2/2003 | Bailiff |
| 2004/0027391 A1* | 2/2004 | Tu .................................. 345/810 |
| 2004/0193699 A1* | 9/2004 | Heymann et al. ............. 709/218 |
| 2007/0005220 A1* | 1/2007 | Parikh et al. ................... 701/100 |
| 2007/0094267 A1* | 4/2007 | Good et al. ..................... 707/10 |

OTHER PUBLICATIONS

Terunobu Yoshida et al., "Partitioning of XML & Java Programming", Java WORLD, vol. 4, No. 12, IDG Japan, p. 192-197, Dec. 1, 2000.

* cited by examiner

```
<?xml version="1.0" encoding="UTF-8"?>
<!ELEMENT state (theme?, page?, portlet*)>
<!ELEMENT portlet (portlet-mode?, window-state?, parameter*)>
<!ATTLIST portlet
    id CDATA #REQUIRED
>
<!ELEMENT portlet-mode (view|edit|help)>
<!ELEMENT window-state (normal|max|min)>
<!ELEMENT parameter EMPTY>
<!ATTLIST parameter
        name CDATA #REQUIRED
     value CDATA #IMPLIED
>
<!ELEMENT page (#PCDATA)>
<!ELEMENT theme (#PCDATA)>
...

Mapping table (flat)
State → A, theme → B, page → C, portlet → D, id → E, portlet-mode →
F, view → G, edit → H, help → I, window-state → J, normal → K, max
→ L, min → M, parameter → N, name → O, value → P, etc.
```

METHOD, SYSTEM, AND COMPUTER PROGRAM PRODUCT FOR EFFICIENTLY SERIALIZING NAVIGATIONAL STATE IN A PORTAL

CROSS-REFERENCE TO RELATED APPLICATIONS

This application is a Submission Under 35 U.S.C. §371 for U.S. National Stage Patent Application of International Application Number PCT/EP2006/067533, filed 18 Jun. 2006, and entitled A METHOD, SYSTEM, AND COMPUTER PROGRAM PRODUCT FOR EFFICIENTLY SERIALIZING NAVIGATIONAL STATE IN A PORTAL, which is related to and claims priority to European Patent Application Serial Number EP20050112112, filed 14 Dec. 2005, the entirety of which are incorporated herein by reference.

SUBJECT OF THE PRESENT INVENTION

This application is a Submission Under 35 U.S.C. §371 for U.S. National Stage Patent Application of International Application Number PCT/EP2006/063289, filed 16 Jun. 2006, and entitled AUTOCOMPLETION METHOD AND SYSTEM, which is related to and claims priority to European Patent Application Serial Number EP20050112043, filed 13 Dec. 2005, the entirety of which are incorporated herein by reference The present invention relates to a method, system and computer program product for efficiently serializing navigational state in a Portal application, and in particular to reduce the markup size of portal pages, reduce URL length, and reduce processing time needed to generate the URLs being part of the Portal page.

FIELD OF THE PRESENT INVENTION

Navigational state as used by the present invention describes "the current view of the portal that is the result of all navigational interactions of a particular client". The client can request (query) different views by interacting with the Portal page, e.g. by navigating to a new page. This type of user interaction does not change server side state but only requests a new view of the server; it is therefore a "safe" operation in terms of HTTP. The nature of this user interaction is such that the client can navigate back and forward through its recent views using the back and forward button of his browser and that clients can bookmark views and get back to them at a later point in time by invoking a browser bookmark.

One of the main features of HTTP is that it is a stateless protocol i.e. the notion of a session spanning multiple request/response interactions does not exist in HTTP. But as nearly all application scenarios require some mechanism to save their state across requests some mechanisms have emerged that allow for creating (logical) stateful sessions and that can be certainly considered as state of the art nowadays. The two most popular state saving mechanisms are Cookies (RFC 2109) and Hidden Input Fields.

However, both approaches have some major drawbacks with regard to bookmarkability, caching, back/forward button, and indexing by search engines ("crawlability"). Therefore, a new navigational state saving approach has emerged which encodes the navigational state into the URL. Different navigational states result in different URLs. Being formerly form-based applications only, today's Web applications become more and more complex, in particular in the portal environment where many components (portlets) are combined into a larger portal application.

This leads to the problem that the navigational state "describing" a certain view of a portal becomes quite voluminous because the portal must aggregate the navigational state of all portlets the user interacted with. The capability of efficiently serializing (and de-serializing respectively) navigational state into a URL must therefore be considered a key capability to meet the today's performance requirements being forced up from release to release ('faster!', 'less memory!').

PRIOR ART

In portal applications, navigational state is typically represented as a hierarchical tree-like document that contains the entire information describing the current navigational state. The valid structure of the hierarchical document is defined in a state model (typically a document type definition (DTD) or XML schema definition (XSD)). In order to be able to encode navigational state into a URL or into the header of a new portal page (e.g. in the HTML base tag), it is necessary to serialize this hierarchical state document.

Prior art techniques for serializing hierarchical object structures are typically based on either XML serialization techniques or Java object serialization. In the field of portals these techniques are not sufficient because they do not consider the characteristics of portal-specific navigational state. Portals combine several applications, so-called portlets, into a larger portal application. Therefore the portal needs to manage the navigational state of all those portlets as well. In other words the navigational state describing a particular portal view needs to comprise the navigational states of all portlets.

The navigational state of a portlet is typically expressed by means of so-called render parameters that are defined by the portlet programmer. Therefore the portal is not able to control the navigational state of portlets. Portlet programmers are free to arbitrarily define as many and as complex render parameters as they want. Neglecting this fact during navigational state serialization will most likely result in too long URLs that even exceed the HTTP-specific URL length limit of 2 KB. In addition to portlet-specific state, the navigational state of a portal has to also include the state of page navigation controls, administrative toolbars, and any other elements of the portal user interface. Thus the navigational state of a certain portal view becomes extraordinarily complex.

OBJECT OF THE PRESENT INVENTION

It is object of the present invention to provide a method, system, and computer program product for efficiently serializing navigational state of a Portal avoiding the disadvantages of the existing prior art.

SUMMARY OF THE PRESENT INVENTION

The present invention uses a completely stream-based serialization which transforms the hierarchical object representation of navigational state (input) into a flat character-based representation of minimum length (output).

Basically the present invention divides the stream-based serialization into two sub-processes.

The first stream-based serialization sub-process which is hierarchy-oriented uses the hierarchical object representation of the navigational state and transforms it into a series of events. The events serve as the input for various strategies for compacting information that is associated with these events.

At the end of the sub-process the compacted navigational state information carried by the received events is transformed into a character-based representation and the hierarchical structure of the navigational state is derived from the order of the received events and transformed into an additional character-based representation both being directly streamed to the second sub-process.

The second stream-based serialization sub-process which is hierarchy-independent uses the result of the first sub-process and applies further compression and character encoding strategies before streaming the compressed and character encoded information into a URL or the header of said new Portal page. Both sub-processes are seamlessly linked together.

The inventive stream-based serialization is efficient because it minimizes the overall processing time needed to generate a URL and also effective because it makes sure that the serialization result is as short as possible to meet the requirements regarding URL length and markup size.

In a preferred embodiment of the present invention the hierarchy-oriented first sub-process is based on an event-based filter chain which is responsible for the mentioned compaction of the navigational state information. Each of these filters applies a certain strategy on the received events generated at the beginning of this sub-process. After processing an event the filter passes the event including the associated (now compacted) state information to the next filter being part of the filter chain.

The hierarchy-independent second sub-process is preferably realized using a character-based writer chain. This allows for directly streaming the state information that has been compacted in the scope of the first serialization sub-process to that writer chain in order to immediately compress the received information.

The inventive serialization method allows for adding arbitrary strategies, either filters that are included into the event-based filter chain or writers that are included into the character-based writer chain.

In a preferred embodiment of the present invention the event-based filter chain consists of two filters implementing the following two strategies:

The so-called render parameter mapping strategy focuses on the navigational state of portlets, in particular on the render parameters of portlets. The render parameter mapping strategy monitors the complexity of render parameters of a particular portlet in terms of the length of the parameter names and values. If a parameter name or value exceeds a certain pre-defined threshold, the strategy will map the complete parameter to a short key consisting of one character only. This strategy is put into practice by filtering the events representing render parameters and processing them accordingly.

The so-called token mapping strategy is responsible for handling pre-defined portal-specific state tokens (names, state values) that can be directly derived from the navigational state model (either the mentioned DTD or XSD). It maps all those names and values to a short one-character representation. This strategy is put into practice by filtering each and every event and subsequently processing the associated information (the names and values mentioned above) accordingly.

BRIEF DESCRIPTION OF THE SEVERAL VIEWS OF THE DRAWINGS

The above, as well as additional objectives, features and advantages of the present invention will be apparent in the following detailed written description.

The novel features of the invention are set forth in the appended claims. The invention itself, however, as well as a preferred mode of use, further objectives, and advantages thereof, will be best understood by reference to the following detailed description of an illustrative embodiment when read in conjunction with the accompanying drawings, wherein:

Figure 1:
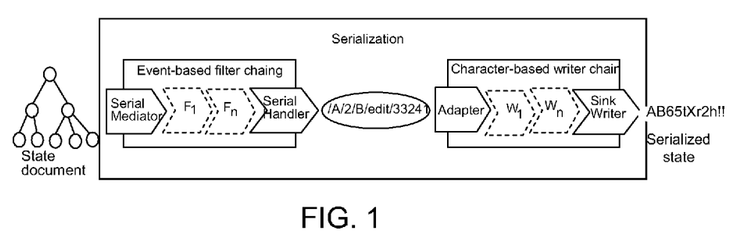
FIG. 1 shows the inventive stream-based serialization method in a simplified way and particularly illustrates the preferred two step approach of transforming the hierarchical navigational state document into a flat character-based representation and thereafter further compressing that character-based representation.

The inventive stream-based serialization method is shown in FIG. 1.

The serialization method is divided into two sub-processes which are both stream-based. The first stream-based serialization sub-process which is hierarchy-oriented uses the hierarchical object representation of the navigational state and transform it into a series of events, wherein the events serve as the input for various strategies for compacting the information that is associated with these events, wherein at the end of said sub-process the compacted navigational state information carried by the received events is transformed into a character-based representation and the hierarchical structure of said navigational state is derived from the order of the received events and transformed into an additional character-based representation both being directly streamed to said second sub-process.

The second stream-based serialization sub-process which is hierarchy-independent uses the result of said first sub-process and applies further compression and character encoding strategies before streaming the compressed and character encoded information into a URL or header of said new Portal page.

Both sub-processes are seamlessly linked together.

In a preferred embodiment, the first hierarchy-oriented sub-process is realized using an event-based filter chain that consists of a set of filters $F_1 \ldots F_n$ being responsible for compacting the state information contained in the hierarchical object representation to be serialized. Each filter $F_i$ implements a certain strategy that contributes to fulfilling this objective.

The filter chain obtains a series of events that reflects the hierarchical structure of the input navigational state. Each event carries the concrete state information of a particular node in the hierarchical structure i.e. the node's name, value, and attributes. Thus the filters are able to examine the state information retrieved from the respective event and react accordingly. Typically a filter concentrates on one specific aspect of state information, e.g. portlet-specific navigational state. In other words, the filter intercepts the events it is interested in (for example by means of their name), processes these events accordingly, and then passes them on to the next filter in the chain. All other events that do not match the required criteria are delegated unchanged to the next filter.

Before executing the filter chain, the serialization component has to generate the series of events that corresponds with the given hierarchical object representation to be serialized. The component being responsible for this translation step is a so-called serialization mediator (see FIG. 1).

Figure 2:
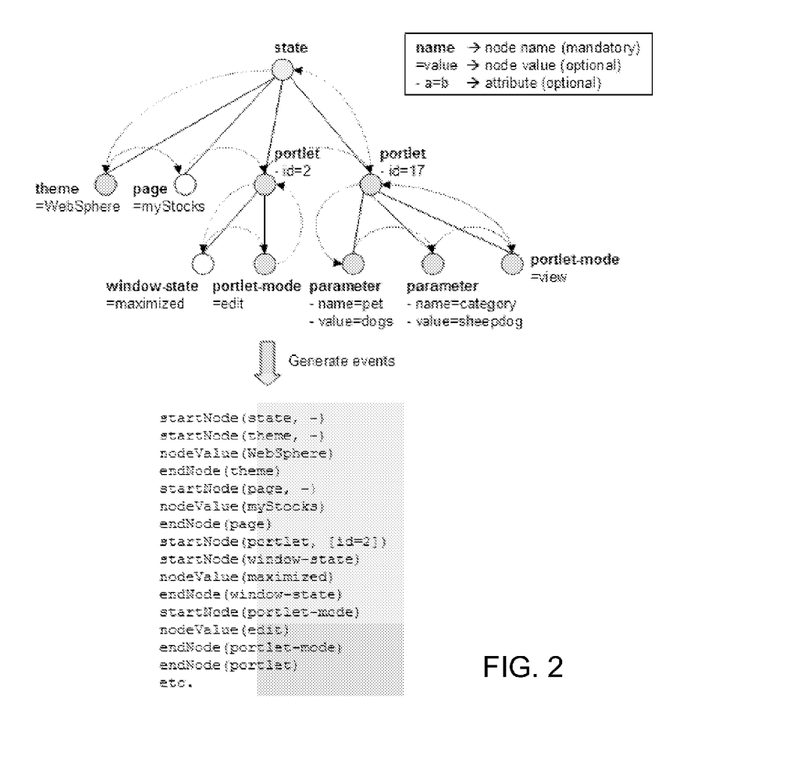
FIG. 2 shows the transformation of a given hierarchical navigational state document into a series of events by means of an exemplary navigational state document according to the present invention.
Figure 3:
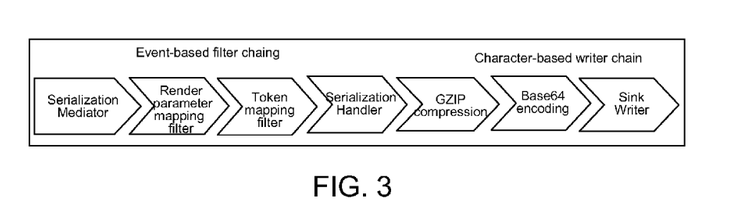
FIG. 3 shows a preferred embodiment of the two step serialization approach, in particular the concrete embodiment of the event-based filter chain and character-based writer chain according to the present invention.

As shown in FIG. 2, the serialization mediator traverses the hierarchical state document (using a breadth-first search algorithm as illustrated by means of the dotted arrows) in order to initiate the event stream. For each visited node, the serialization mediator creates a startNode event populated with the node name as well as node attributes (if any), a nodeValue event populated with the node value (if any), and an endNode event to indicate that the processing of the node is completed. Note that the order of the generated events, in particular the nesting of startNode events, reflects the hierarchy of the input document.

After its creation, the serialization mediator sends the event to the first event-processing filter $F_1$ in the chain. FIG. 2 also shows the event stream that corresponds with the depicted exemplary navigational state document. The names that are used to denote the various events go back to terms that are related to XML processing techniques (e.g. the Java SAX API).

By means of the information that is associated with an event (e.g. the node name that is transmitted along with a startNode event), each filter is able to intercept the sort of events it is interested in and modify the carried information (e.g. the node value or even the node name) before passing the event to the next filter.

After an event has passed all filters it reaches the so-called serialization handler (see FIG. 2) which is responsible for transforming the received events carrying the compacted state information into a flat character representation. In order to achieve that the serialization handler gradually appends the names, values, and attributes to a character-based representation and then passes the resulting character string to the second serialization sub-process for further compression and character encoding. After all events have been processed, the serialization handler hands over an additional piece of information that reflects the hierarchy of the navigational state document. This piece of information is needed to restore the hierarchy of the state document during de-serialization later on. To encode the hierarchy information, the serialization handler simply encodes a bit representation that corresponds with the nesting of the formerly processed startNode events.

The second sub-process, which is also completely stream based, processes the received character strings by means of the mentioned character-based writer chain $W_1 \ldots W_n$ (see FIG. 1). Each writer applies a specific compression or character encoding strategy to the received character strings before passing them to the next writer in the chain. Note that these writers cannot make any assumptions about the received character strings, neither about the semantics of the contained information nor about its internal structure. Therefore they can only apply generic character compression and encoding techniques, e.g. state of the art compression techniques such as GZIP. After the various writers have applied their compression (e.g. GZIP) and character encoding (e.g. UTF-8) strategies, the resulting character representation is written to a certain data sink. The data sink is typically a URL which then carries the serialized form of the navigational state. When clicking on such a URL the navigational state portion has to be retrieved from that URL for state de-serialization. During de-serialization all serialization strategies have to be revoked as explained in the following section.

The preferred embodiment of the event-based filter chain and character-based writer chain is shown in FIG. 2. The colour gradient emphasizes the seamless transition from the event-based filter chain on the left to the character-based writer chain on the right.

As illustrated, the event-based filter chain consists of two filters (in addition to the system-specific serialization mediator and serialization handler) that have been outlined in the invention summary. The first event processing filter implements the portlet render parameter mapping strategy whereas the second filter applies a generic mapping of all pre-defined tokens (names and values) contained in the navigational state document. For details on these concrete filters please refer to the section following the de-serialization section. The character-based writer chain consists (in addition to the sink writer which just streams the result to a particular data sink) of a writer that performs a GZIP compression and another writer that performs a base 64 character encoding.

Figure 4:
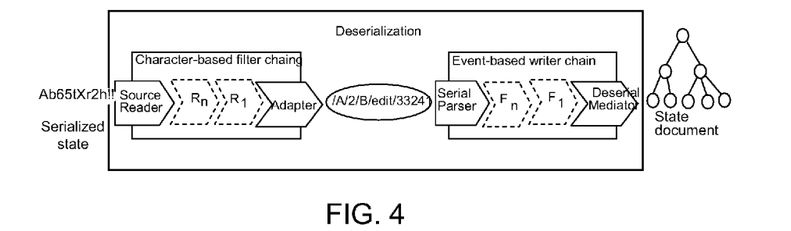
FIG. 4 shows the inventive de-serialization process being the counterpart of the serialization process as shown in FIG. 1 and particularly illustrates the preferred two step approach of de-compressing the flat character-based representation and thereafter transforming that flat representation back to the original hierarchical object representation.

The counterpart de-serialization process is responsible for transforming a given flat character representation of navigational state back to the original hierarchical tree-like object representation of navigational state. The de-serialization process is shown in FIG. 4.

As illustrated, the input data processed by the inventive de-serialization method is the flat character representation of minimum length. The de-serialization result is the hierarchical object representation of navigational state that is equivalent to the navigational state before serializing it.

As being the counterpart to serialization, the de-serialization process is also divided into two sub-processes. First, a character-based reader chain revokes the compression and character encoding strategies applied during serialization by applying the counterpart decompression and character decoding techniques $R'_n \ldots R'_1$. After that sub-process, the hierarchy of the navigational state document is restored before applying again an event-based filter chain $F'_n \ldots F'_1$ in order to revoke the information compaction strategies done during serialization. Note that $F'_i$ denotes the filter that applies the inverse strategy that corresponds with filter $F_i$. The following paragraphs describe the de-serialization in detail as shown in FIG. 4.

The first component that is involved in de-serialization is the so-called source reader. The source reader is a character reader that operates on a given data source. In our case it reads the serialized navigational state from a URL and submits the read character strings to the reader chain $R'_n \ldots R'_1$. The reader chain revokes the character encoding and compression performed during serialization by applying the corresponding character decoding and decompression techniques. Acting as the adapter between the character-based reader chain and the event-based filter chain, the serialization parser buffers the received character strings in order to finally transform it back to a series of events that is equivalent to the event stream during serialization. In order to achieve that it has to take the encoded hierarchy information into account to generate the events in the right order with the right nesting. Note that the serialization parser can easily execute this task because it is the counterpart component of the said serialization handler thus having the required knowledge about how to interpret the serialized hierarchy information.

Thereafter the stream of events passes the event-based filter chain $F'_n \ldots F'_1$ reversing the information compaction done during serialization. At the end of the event-based filter chain the so-called de-serialization mediator (the counterpart component of the serialization mediator) directly maps the received events to controller operations in order to restore the hierarchical object representation by creating the nodes and connecting them to each other. After all, the entire original navigational state document has been restored. This step concludes the de-serialization process.

The Render Parameter Mapping Filter

The render parameter mapping filter focuses on the navigational state of portlets, in particular on the render parameters of portlets. The strategy implemented by this filter monitors the complexity of render parameters of a particular portlet in terms of the length of the parameter names and values. If a parameter name or value exceeds a certain pre-defined threshold, the strategy will map the event representing the complete parameter to an event carrying a short key consisting of one character only whereas the concrete parameter names and values are serialized into the user's HTTP session.

Figure 5:
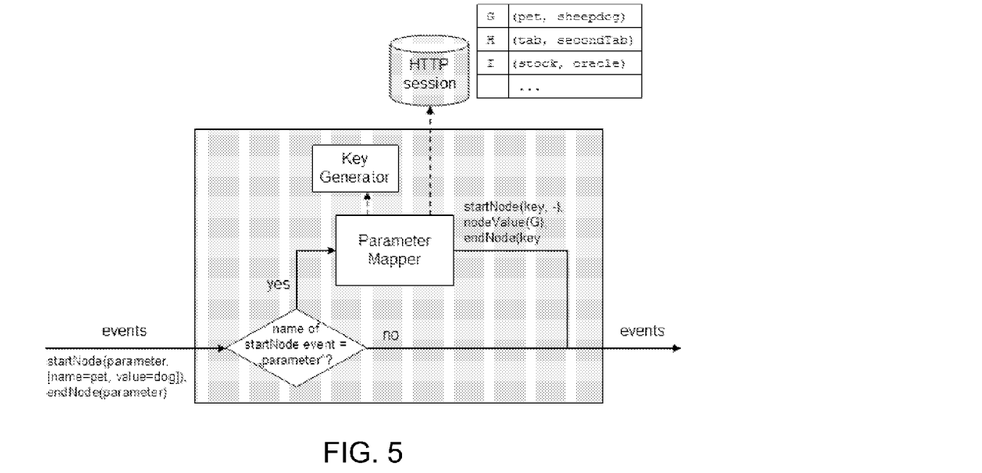
FIG. 5 shows the internal structure of the render parameter filter including the internal interactions performed during state serialization preferably used by the present invention.

FIG. 5 shows the internal structure of the render parameter filter that is used during state serialization (the inverse filter needed during de-serialization is discussed later on).

First the filter checks whether the received startNode event indicates a portlet render parameter (by means of the node name "parameter"). If the filter detects such an event (the "yes" branch), it passes it to an internal parameter mapper component that performs the complexity check. Otherwise (the "no" branch) it just delegates the event to the next filter in the filter chain.

The parameter mapper performs the complexity check by evaluating the name and value of the render parameter in terms of their length. If the configured length threshold is exceeded it maps the parameter to a short key (a character) and sends an event carrying this key only to the next filter. The actual render parameter as well as the generated key is serialized into the HTTP session. Note that this procedure takes the risk of too large HTTP sessions. Therefore the key-parameter mappings have to be managed using an expiration policy that evicts the stored mappings on a least-recently-used (LRU) strategy.

Figure 6:
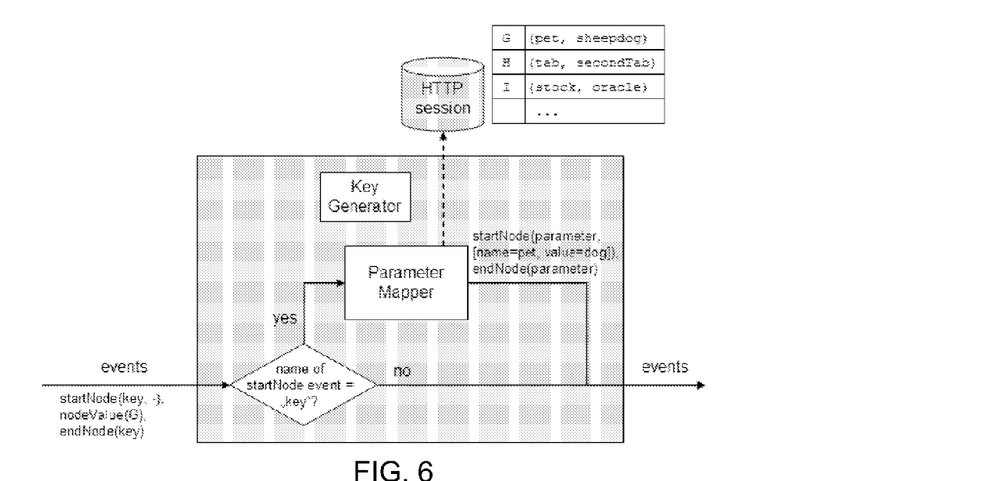
FIG. 6 shows the internal structure of the render parameter filter including the internal interactions performed during state de-serialization preferably used by the present invention.

FIG. 6 shows the internal structure of the counterpart filter that revokes this mapping during de-serialization. In that case the filter intercepts events representing such keys only. If such an event has been detected the filter re-routes the key event to the internal parameter mapper component that uses the received key to look up the concrete parameter name and value in the HTTP session. As soon as the event carrying the actual render parameter is restored it is passed to the next filter in the chain.

The Token Mapping Filter

The token mapping filter implements a generic strategy that aims at compacting as many tokens as possible. Therefore it does not intercept events that match a certain criteria (e.g. a specific node name) but tries to map all tokens i.e. the name, value, and attributes of each received event. In order to perform this mapping it reuses the information retrieved from the state model definition. As already mentioned before, the state model definition specifies the valid structure (i.e. the relationships between node names as well as the data types of node values and attribute values) of a navigational state document and is typically described in a DTD or XSD file. Based on that definition, the token mapping filter derives a mapping table which assigns each pre-defined token contained a one-character substitute. Pre-defined tokens include the names of nodes and attributes (which are completely specified in the state model definition) as well as all node and attribute values that are explicitly specified in the state model definition.

Figure 7:
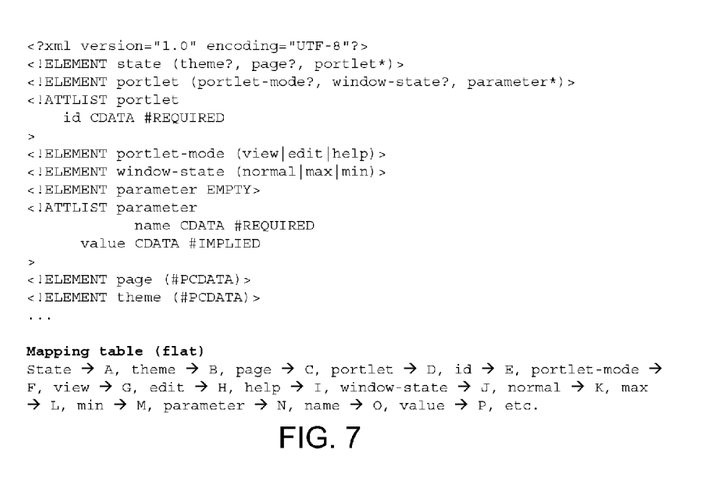
FIG. 7 shows an exemplary state model definition using a DTD syntax and the mapping table that can be derived from it preferably used by the present invention.

FIG. 7 shows a sample state model definition using a DTD similar syntax including the token mapping table that is derived from that definition. The depicted mapping table is flat i.e. does not reflect the hierarchy of the state model. In typical scenarios where the state model is much more complex it is recommended to also exploit the hierarchy of the state model. In that case a so-called mapping tree is derived from the DTD instead of a flat mapping table. In a mapping tree the mappings have to be unique in the scope of a certain tree level only.

Figure 8:
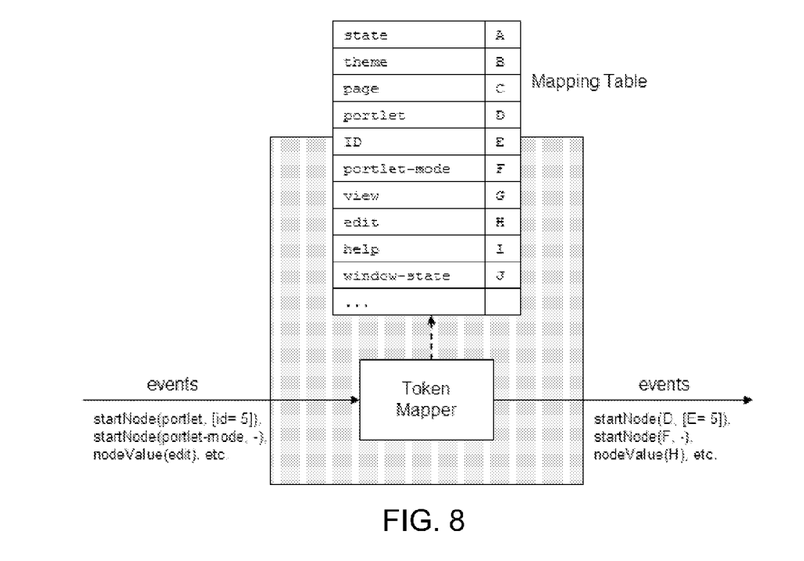
FIG. 8 shows the token mapping filter using the mapping table to map all pre-defined tokens to short one character representations during state serialization preferably used by the present invention.

FIG. 8 shows how the flat mapping table is applied on a sample stream of events. Note that the token mapping filter must be the last filter in the event-based filter chain because it modifies the names of the document nodes typically serving as the filter criteria of other filters (otherwise all other filters that are executed after the token mapping filter would need to know the mapping table).

All node and attribute values that are not specified in the state model definition cannot be mapped to a short one character representation. This applies in particular to the names and values of portlet render parameters.

Figure 9:
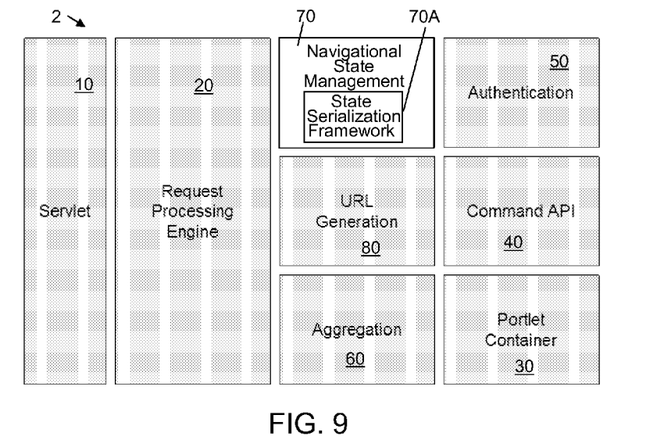
FIG. 9 shows a Portal structure implementing the present invention.

FIG. 9 shows a Portal structure implementing the present invention.

The portal structure preferably comprises function components which are already part of each prior art portal and those components which are newly added in order to provide the inventive functionality.

The prior art function components which are being part of each Portal are following:

Servlet 10

The Servlet 10 is the front controller that receives the incoming HTTP requests. It typically prepares the request processing engine 20 for processing the received HTTP request by initializing the components involved. After that the servlet 10 delegates the processing of the request to the request processing engine 20.

Request Processing Engine 20

The request processing engine 20 is also part of the front controller being responsible for controlling the processing of the incoming requests. Typically it defines a request processing lifecycle that is made up of several request processing phases. In a Portal a request has to walk through four phases. First, the init phase performs request-specific initialization tasks followed by the action phase being responsible for authentication and action execution (Portlet actions as well as commands). After the action phase the render phase is executed by invoking the aggregation process. The terminal phase concludes request processing by performing request-specific cleanup tasks.

Aggregation Component 60

The aggregation component 60 is invoked during the render phase of the request processing lifecycle. It is responsible for transforming the layout model (describes how portlets are arranged on the page) of the requested page into a presentation tree as well as writing the markup that corresponds to this presentation tree to the response.

Authentication Component 50

The authentication component 50 is responsible for verifying the identity of the user. Each incoming request has to pass authentication. The Portal 2 uses the user identity to determine the content the user is authorized to access as well as the commands to execute.

Portlet Container 30

The Portlet container 30 provides unified access to the Portlets. In particular it allows for gathering the markup of a certain Portlet or executing a Portlet action. The Portlet container invokes Portlets by means of the Portlet API.

Command API 40

The command API 40 (application programming interface) provides an abstraction layer for Portal-specific commands. In particular it allows for executing commands via a unified interface. Commands may be used to perform administrative tasks such as creating and/or deleting portal pages, adding and/or removing Portlets to and/or from portal pages, arranging Portlets on existing pages and so on.

Navigational State Management Component 70

The navigational state management 70 component has the following responsibilities:

defining a lifecycle for navigational state as well as providing an interface that enables the request processing engine 20 to incorporate the defined state processing tasks into the overall request processing lifecycle, defining an object model to represent navigational state as well as providing an application programming interface (API) that allows for reading and writing/modifying navigational state, providing a framework that allows for efficiently serializing the object representation of navigational state into a URL as well as de-serializing navigational state from an (incoming) URL to restore the internal object representation. The framework needs to include interfaces that can be invoked by the URL generation component to create URLs carrying navigational state, URL Generation API 80

The URL generation API 80 provides, as the name implies, an API that allows for creating URLs for a variety of use cases. It enables the programmer to associate navigational state with the created URL as well as to write the URL to a given destination stream. This write operation involves serializing the navigational state that has been associated with the created URL. In addition to creating URLs programmatically, the URL generation API typically offers some URL tags to create URLs within JSPs.

By default a created URL is initialized with the request-specific navigational state to make sure that the navigational state of previous interactions does not get lost. To determine the specific semantics of the URL this navigational state may be changed for this particular URL only.

The newly added function component that provides the inventive functionality refines the navigational state management component 70:

State Serialization Framework 70 A

The state serialization framework 70 A is a subcomponent of the navigational state management component 70 that puts the invented stream-based serialization method. It is in particular responsible for providing:

a first stream-based serialization sub-process being hierarchy-oriented that uses the hierarchical object representation of said navigational state and transform it into a series of events, wherein said events serve as the input for various strategies for compacting the information that is associated with these events, wherein at the end of said sub-process the compacted navigational state information carried by said received events is transformed into a character-based representation and the hierarchical structure of said navigational state is derived from the order of said received events and transformed into an additional character-based representation both being directly streamed to said second sub-process, a second stream-based serialization sub-process being hierarchy-independent that uses the result of said first sub-process and applies further compression and character encoding strategies and finally streaming the compressed and character encoded information into a URL or header of said new Portal page, wherein both sub-processes are seamlessly linked together, assembling multiple serialization strategies (as well as the counterpart de-serialization strategies) to a (de-) serialization chain, offering plug points to plug in further strategies in the future, providing an application programming interface (API) that allows for executing the assembled serialization chain during URL generation as well as executing the de-serialization chain during URL decoding.

The input data of the component is either a hierarchical navigational state document for serialization or a serialized character-representation of navigational state for de-serialization.

The invention claimed is:

1. A method for efficiently serializing navigational state in a Portal, wherein said Portal is running in a server system, wherein said server system includes a communication component which allows communication between said Portal and a client browser via a communication channel, wherein said Portal determines a layout of a requested Portal page, invokes rendering of page elements belonging to said Portal page, and transmits said Portal page to the client browser for displaying, wherein at least one page element of said Portal page provides a link comprising functionality for initiating rendering of a new page or a new page element by said Portal, wherein each user interaction by clicking said link at said at least one page element generates a new navigational state of said Portal, wherein said new navigational state describes a current view of said Portal as a result of all previous navigational interactions of a particular client, wherein in response to a client request for a new Portal page said new navigational state is encoded in a serialized form into one of each uniform resource location (URL) or into a header of the new Portal page, wherein said method comprises the following two sub-processes:

a first stream-based serialization sub-process being hierarchy-oriented that uses a hierarchical object representation of said new navigational state and transforms the new navigational state into a series of events, wherein said events in said series of events serve as input for a selection of strategies for compacting information that is associated with the events, wherein at an end of said sub-process compacted navigational state information carried by said events is transformed into a character-based representation of said navigational state information and a hierarchical structure of said new navigational state is derived from an order of said events and transformed into an additional character-based representation of said navigational state information both character-based representations being directly streamed to said second sub-process, a second stream-based serialization sub-process being hierarchy-independent that uses a result of said first stream-based serialization sub-process and applies a plurality of further compression and character encoding strategies and finally streams compressed and character encoded information into one of a URL and header of said new Portal page,
wherein both sub-processes are linked together.

2. A method according to claim 1, wherein said first sub-process is based on a event-based filter chain, wherein each filter in the chain operates on a specifically assigned subset of events and applies a certain strategy for compacting the navigational state information that is associated with said events.

3. A method according to claim 2, wherein said first sub-process generates the stream of events for the event-based filter chain by traversing a hierarchical object representation of navigational state and generates for each visited node of said object representation a startNode event populated with the node name as well as the node attributes, a nodeValue event populated with the node value, and an endNode event to indicate the end of the node.

4. A method according to claim 3, wherein said generated startNode, nodeValue, and endNode events are generated in a order reflecting a hierarchical tree structure of navigational state object representation, wherein said endNode event is generated not until before a complete sub-tree of the respective node is processed.

5. A method according to claim 4, wherein at the end of the said event-based filter chain a special filter is used to encode the hierarchical structure which is laid down in an order of received events and in a nesting of the received startNode events.

6. A method according to claim 2, wherein said second sub-process uses a character-based writer chain, wherein each writer in said chain performs a certain compression or character encoding strategy on received character information generated at an end of said first sub-process.

7. A method according to claim 6, wherein at an end of said character-based writer chain a special writer is used that directly streams compressed character information into the URL or the header of the Portal page.

8. A system for efficiently serializing navigational state in a Portal, wherein said Portal is running in said system, wherein said system includes a communication component executing in memory of a computer which allows communication between said Portal and a client browser via a communication channel, wherein said Portal determines a layout of a requested Portal page, invokes rendering of page elements belonging to said Portal page, and transmits said Portal page to the client browser for displaying, wherein at least one page element of said Portal page provides a link comprising functionality for initiating rendering of a new page or a new page element by said Portal, wherein each user interaction by clicking said link at said at least one page element generates a new navigational state of said Portal, wherein said new navigational state describes a current view of said Portal as a result of all previous navigational interactions of a particular client, wherein in response to a client request for a new Portal page said new navigational state is encoded in a serialized form into one of each uniform resource location (URL) or into a header of the new Portal page, wherein said system performs method that comprises the following two sub-processes:
 a first stream-based serialization sub-process being hierarchy-oriented that uses a hierarchical object representation of said new navigational state and transforms the new navigational state into a series of events, wherein said events in said series of events serve as input for a selection of strategies for compacting information that is associated with the events, wherein at an end of said sub-process compacted navigational state information carried by said events is transformed into a character-based representation of said navigational state information and a hierarchical structure of said new navigational state is derived from an order of said events and transformed into an additional character-based representation of said navigational state information both character-based representations being directly streamed to said second sub-process,
 a second stream-based serialization sub-process being hierarchy-independent that uses a result of said first stream-based serialization sub-process and applies a plurality of further compression and character encoding strategies and finally streams compressed and character encoded information into one of a URL and header of said new Portal page,
wherein both sub-processes are linked together.

9. A system according to claim 8, wherein said communication component is an integrated part of a navigational state management component.

10. A system according to claim 9, wherein said navigational state management component is part of said Portal.

11. A system according to claim 8, wherein said communication component provides said first sub-process and generates the stream of events for the event-based filter chain by traversing a hierarchical object representation of navigational state and generates for each visited node of said object representation a startNode event populated with a node name as well as node attributes, a nodeValue event populated with a node value, and an endNode event to indicate an end of the visited node, wherein said generated startNode, nodeValue, and endNode events are generated in an order reflecting a hierarchical tree-like structure of the navigational state object representation, wherein said endNode event is generated not until before a complete sub-tree of the node is processed, wherein at an end of the said event-based filter chain a special filter is used to encode the hierarchical structure which is laid down in an order of the received events and in the nesting of the received startNode events.

12. A computer program product for efficiently serializing navigational state in a Portal, the computer program product comprising a computer readable storage medium having computer readable program code embodied therewith, wherein said Portal is running in a server system, wherein said server system includes a communication component which allows communication between said Portal and a client browser via a communication channel, wherein said Portal determines a layout of a requested Portal page, invokes rendering of page elements belonging to said Portal page, and transmits said Portal page to the client browser for displaying, wherein at least one page element of said Portal page provides a link comprising functionality for initiating rendering of a new page or a new page element by said Portal, wherein each user interaction by clicking said link at said at least one page element generates a new navigational state of said Portal, wherein said new navigational state describes a current view of said Portal as a result of all previous navigational interactions of a particular client, wherein in response to a client request for a new Portal page said new navigational state is encoded in a serialized form into one of each uniform resource location (URL) or into a header of the new Portal page, wherein said computer readable program when executed in memory of a computer performs a method that comprises the following two sub-processes:
 a first stream-based serialization sub-process being hierarchy-oriented that uses a hierarchical object representation of said new navigational state and transforms the new navigational state into a series of events, wherein said events in said series of events serve as input for a selection of strategies for compacting information that is associated with the events, wherein at an end of said sub-process compacted navigational state information carried by said events is transformed into a character-based representation of said navigational state information and a hierarchical structure of said new navigational state is derived from an order of said events and transformed into an additional character-based representation of said navigational state information both character-based representations being directly streamed to said second sub-process, a second stream-based serialization sub-process being hierarchy-independent that uses a result of said first stream-based serialization sub-process and applies a plurality of further compression and character encoding strategies and finally streams compressed and character encoded information into one of a URL and header of said new Portal page, wherein both sub-processes are linked together.

13. A computer program product according to claim 12, wherein said first sub-process is based on a event-based filter chain, wherein each filter in the chain operates on a specifically assigned subset of events and applies a certain strategy for compacting the navigational state information that is associated with said events.

14. A computer program product according to claim 13, wherein said first sub-process generates the stream of events for the event-based filter chain by traversing a hierarchical object representation of navigational state and generates for each visited node of said object representation a startNode event populated with the node name as well as the node attributes, a nodeValue event populated with the node value, and an endNode event to indicate the end of the node.

15. A computer program product according to claim 14, wherein said generated startNode, nodeValue, and endNode events are generated in a order reflecting a hierarchical tree structure of navigational state object representation, wherein said endNode event is generated not until before a complete sub-tree of the respective node is processed.

16. A computer program product according to claim 15, wherein at the end of the said event-based filter chain a special filter is used to encode the hierarchical structure which is laid down in an order of received events and in a nesting of the received startNode events.

17. A computer program product according to claim 13, wherein said second sub-process uses a character-based writer chain, wherein each writer in said chain performs a certain compression or character encoding strategy on received character information generated at an end of said first sub-process.

18. A computer program product according to claim 17, wherein at an end of said character-based writer chain a special writer is used that directly streams compressed character information into the URL or the header of the Portal page.

* * * * *